Sept. 26, 1950     L. B. MILLER     2,523,583

TIRE

Filed May 2, 1947

Inventor

Luke B. Miller

By *Clarence A. O'Brien and Harvey B. Jacobson*
Attorneys

Patented Sept. 26, 1950

2,523,583

UNITED STATES PATENT OFFICE 2,523,583

TIRE

Luke B. Miller, Mason City, Iowa

Application May 2, 1947, Serial No. 745,565

1 Claim. (Cl. 152—333)

This invention relates to new and useful improvements in boots for tires and the primary object of the present invention is to provide a pressure boot for the inner periphery of a tire casing whereby a tire may be safely used even though several cuts or breaks are formed on the tire.

Another important object of the present invention is to provide a tire boot that is quickly and readily vulcanized to a tire casing.

A further object of the present invention is to provide a boot made from discarded tires that is applied to a tire casing in a reversed procedure from those being used at present in order to divert the pressure in the tire from the break so that the break in the tire will not spread or increase.

A still further aim of the present invention is to provide a device of the character referred to that is simple and practical in construction, strong and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
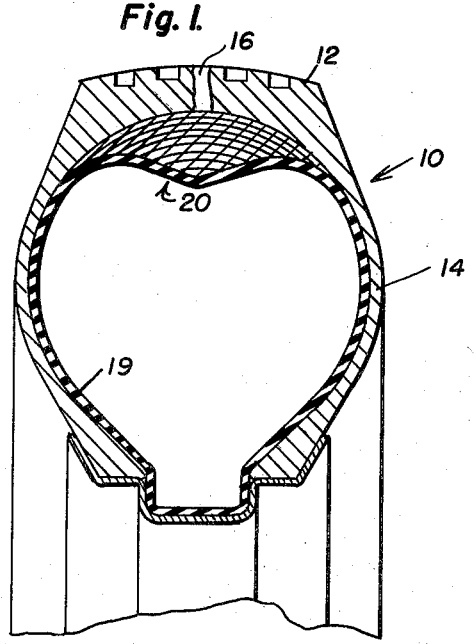
Figure 1 is a transverse fragmentary sectional view of a tire having a break in its tread and showing the present invention applied thereto.
Figure 2:
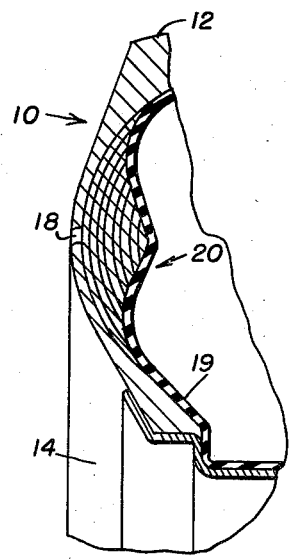
Figure 2 is a fragmentary transverse sectional view of a tire having a break in its casing or side wall and showing the present boot applied thereto.
Figure 3:
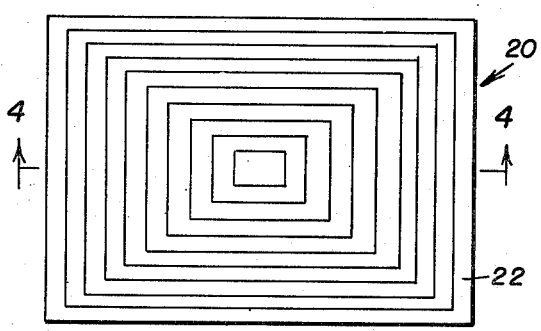
Figure 3 is a top plan view of the tire boot.
Figure 4:
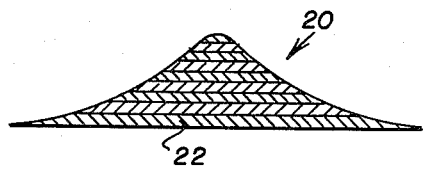
Figure 4 is a vertical transverse sectional view taken on line 4—4 of Figure 3.

Referring now to the drawings in detail, wherein, for the purpose of illustration, there is disclosed a preferred embodiment of the present invention, the numeral 10 represents generally a usual tire including a tread portion 12 and side wall 14.

Frequently in the use of a tire, the tread will become split, as at 16, due to contact with a nail, glass or other sharp object. The casing or side wall 14 also becomes worn and splits or breaks, as at 18, which causes the inner tube 19 to be punctured, resulting in a flat tire.

To overcome this undesirable occurrence and to strengthen the inner periphery of the tire, the present invention provides a boot designated generally by the numeral 20.

This boot is easily cut from a discarded tire or may be made from laminated layers of substantially rectangular rubberized material 22 of gradually reduced circumference or area and arranged to form a substantially pyramidal object.

When a break or slit occurs in a tire, the increased opening permits the inner tube to expand through the break and hence upon contact with a sharp object the inner tube will be deflated.

To prevent the inner tube from passing through the cut, the larger area or bottom layer of the boot is cemented or vulcanized to the inner periphery of the tire at the point of break with the apex portion of the boot projecting slightly inwardly against the inner tube. In this manner, decreased pressure in the tire can be maintained which prevents an increase in the break and cushions the tire upon contact of the surface over which the tire passes.

Obviously, the device may be used as an inner lining for new tires spaced circumferentially about the tire and dividing the tire into various chambers. In this manner, the tire will operate efficiently even though under-inflated from its normal capacity without the addition of the boots and also permit the use of a larger brake mechanism on the vehicle for controlling the tire.

What I claim is:

In combination with a tire casing and inner tube, a plurality of resilient substantially pyramidal bodies flexed to the inner periphery of the tire casing and circumferentially spaced, said bodies having rounded apices, the apices of said bodies depressing the inner tube and dividing the same into a plurality of circumferentially spaced compartments.

LUKE B. MILLER.

REFERENCES CITED

The following references are of record in the file of this patent:

UNITED STATES PATENTS

| Number | Name | Date |
| --- | --- | --- |
| 1,897,927 | Domzalski | Feb. 14, 1933 |
| 1,968,606 | Knapton | July 31, 1934 |
| 2,057,797 | Springer | Oct. 20, 1936 |